Sept. 15, 1953     A. H. BURNETT ET AL     2,651,808
SAUSAGE LINK FORMING MACHINE
Filed Sept. 26, 1949
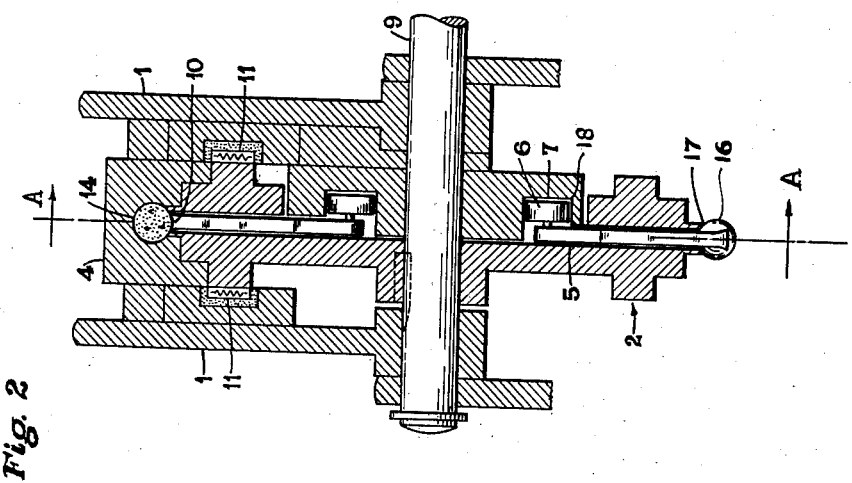
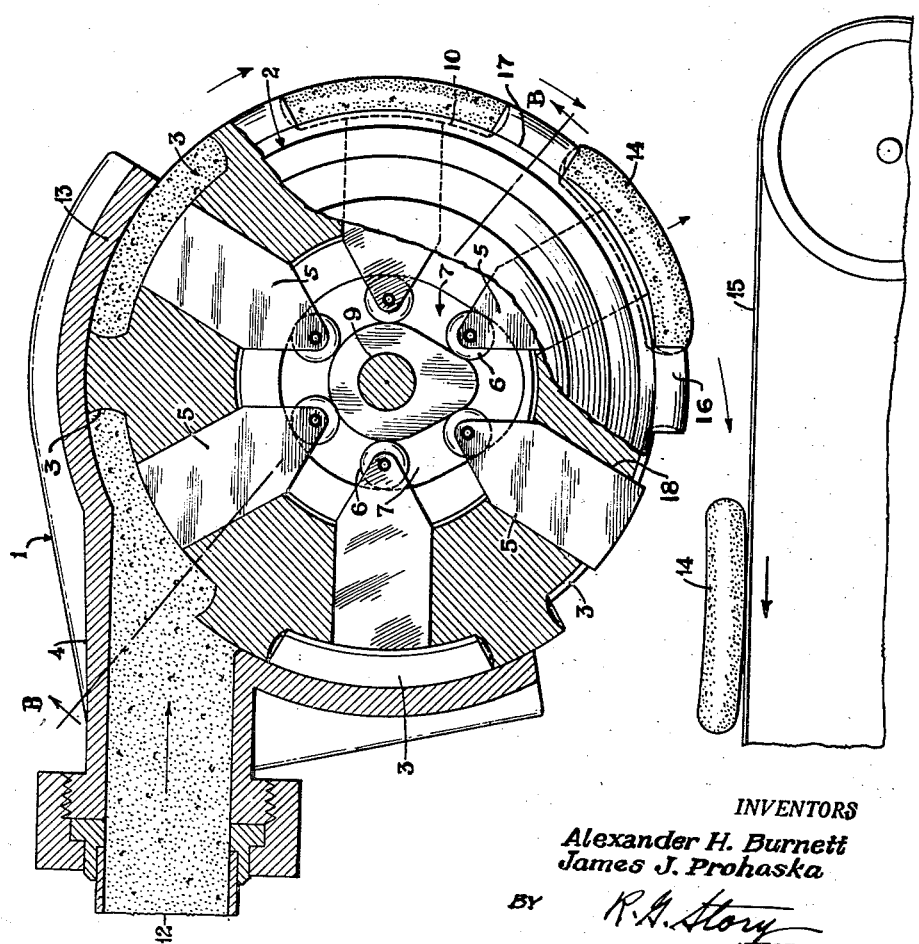
INVENTORS
Alexander H. Burnett
James J. Prohaska
BY
*R. A. Story*
ATTORNEY Patented Sept. 15, 1953

2,651,808

UNITED STATES PATENT OFFICE 2,651,808

SAUSAGE LINK FORMING MACHINE

Alexander H. Burnett, Chicago, and James J. Prohaska, La Grange, Ill., assignors to Swift & Company, Chicago, Ill., a corporation of Illinois Application September 26, 1949, Serial No. 117,858

6 Claims. (Cl. 17—34)

This invention relates to sausage making machines and, more particularly, to an improved machine for continuously molding or forming sausage links and the like.

It is an object of the present invention to provide a means for continuously producing so-called "skinless" sausages.

It is an additional object of this invention to provide an improved apparatus for forming sausage links in a continuous manner from comminuted meat and the like.

It is a further object of this invention to provide means for rapidly and easily removing formed sausage links from molds without permitting sticking of the meat to the molds or deformation of the molded sausage link.

Additional objects, if not specifically pointed out herein, will be apparent to one skilled in the art from the following detailed description of the invention.

In the drawings:

Figure 1 represents a sectional, partial side elevation of the preferred form of the apparatus of this invention taken on line A—A of Figure 2.

Figure 2 represents an end sectional view thereof taken on line B—B of Figure 1, showing the frame and other details hereinafter explained.

Generally the present invention comprises a sausage link forming machine having a plurality of partial molds or pockets positioned about the outer periphery of a rotating wheel, said pockets cooperating with an associated forming means or housing to form molds wherein the comminuted meat or the like, having been injected under pressure, is formed into links of the desired conformation and weight, and is thereafter discharged onto a moving conveyor or other means for packaging, further processing, or the like.

More specifically, referring to Figure 1 of the drawings, numeral 2 represents the rotary forming wheel having partial molds or pockets 3 positioned about the outer periphery thereof. The housing or forming means 4 is mounted on the frame 1, as best shown in Figure 2, extending partially around the forming wheel 2 and forming complete molds with the pockets 3. Each pocket or partial mold 3 has an ejecting means 5 mounted in the central base portion 17 thereof. Each ejecting means is operated by means of a cam follower 6 travelling in cam track 7 about stationary cam 8. Figure 2 illustrates one type of mounting for the apparatus of this invention, the rotary wheel 2 being supported in frame 1 by axle 9. As clearly shown in this view, the housing or forming means 4 is affixed to the frame in cooperating relationship with the pockets of the rotating wheel 2 so that substantially air-tight molds are formed in that portion of the wheel covered by said housing. It has been found necessary to keep the central area of the forming wheel pocket which is in contact with the sausage links 14 as small as possible and yet constructively sound. This area is indicated in Figure 2 at 10. The reason for this relatively small area of contact is to permit the rapid and effective removal of the links from the pockets of the wheel which is required in continuous operation. It will be seen from Figure 2 that as a result of this structure, substantially the entire circumference of the mold at the longitudinal mid portion is formed by the housing and the ejector, with the housing constituting by far the major portion of the circumference. Referring to both Figures 1 and 2, the structure of each pocket 3 on wheel 2 may be defined as formed by raised abutments 16 spaced about the relatively narrower periphery 17 of the wheel 2. As will be seen from Figure 2, abutments 16 are substantially wider than the wheel periphery 17. Between each of the abutments 16, as mentioned above, is positioned an ejector member 5. Such ejector is likewise substantially narrower than the abutments as can be clearly seen in Figure 2. The narrower wheel periphery 17 forms the supporting surface 10 for the meat to be placed in the pocket 3 between each pair of abutments 16, and is recessed as shown at 18 of Figure 2 to form a second pocket for the reception and mounting of ejector 5, said ejector being operatively connected in the manner aforesaid to means which effect reciprocation of the ejector outwardly from the approximate level of the supporting surface 10 to eject the molded product from pocket 3. Also shown in Figure 2 are heaters 11 which may be installed on each side of the forming wheel as illustrated or mounted on the wheel proper to rotate therewith, obtaining their current through slip rings attached to the shaft. In operation these heaters are thermostatically controlled in the range of about 100-140° F., at which temperatures a very thin layer of fat is melted between the product and the forming wheel, allowing the formed link 14 to fall away from the wheel under the impulse of the injector mechanism.

Figure 1 shows comminuted sausage meat or the like 12 being forced into housing 4 by means of a suitable sausage stuffer or the like (not illustrated). The mixture under pressure fills each pocket 3 in turn as the wheel 2 continuously rotates in the direction of the arrows shown in Figure 1. The sausage link is formed by passage of each filled pocket through the cooperating portion of the housing 13 extending along the periphery of the wheel. The heaters 11, as shown in Figure 2, heat a very thin outer layer of the product slightly to aid in the separation of the meat from the walls of pocket 3 and, finally, ejecting means 5 actuated by contact with stationary cam 8 move outwardly from the base 10 of the pocket to eject the formed link 14 which, in Figure 1, is shown as being deposited onto a moving conveyor belt 15. Although only six pockets have been illustrated in the wheel of Figure 1, it is obvious that the number of such pockets may be varied as desired, depending on the diameter of the wheel, size of the links desired, etc.

Obviously, many modifications and variations of the invention as hereinbefore set forth may be made without departing from the spirit and scope thereof, and therefore only such limitations should be imposed as are indicated in the appended claims.

We claim:

1. In a sausage link forming machine, the combination comprising: a narrow supporting surface having a recessed portion defining a pocket therein; a narrow ejector member mounted in said pocket and adapted to move outwardly therefrom; and a pair of abutments on said supporting surface at either side of the recessed portion thereof, said abutments being substantially wider than said supporting surface and ejector member.

2. In a sausage link forming machine the combination comprising: a supporting surface; a pair of raised, spaced abutments on said supporting surface defining therewith a meat-receiving pocket, the supporting surface between said abutments being recessed to define a pocket; and an ejector mounted in the pocket defined by such recessed supporting surface, said ejector being adapted to reciprocate outwardly from the approximate level of said supporting surface to eject material from said meat-receiving pocket; the width of said ejector and said supporting surface being substantially less than that of said abutments.

3. In a sausage link forming machine the combination comprising: a rotary wheel having a plurality of pockets spaced about the narrow periphery thereof, said pockets being defined by broad abutments spaced on and about the narrow periphery of said wheel; a plurality of narrow ejector members disposed in recessed relationship with and between said abutments; and means operatively connected to said ejector members to move them out from and back to the narrow periphery of said wheel.

4. A sausage link forming machine comprising: a narrow rotary wheel having a plurality of pockets spaced about the narrow periphery thereof, said pockets being defined by broad abutments spaced on and about the narrow periphery of said wheel; a plurality of narrow ejector members disposed in recessed relationship with and between said abutments; means operatively connected to said ejector members to move them out from and back to the narrow periphery of said wheel; and a housing associated with said wheel and extending partially therearound, said housing cooperating with said pockets successively as said wheel is rotated to form therewith complete molds.

5. A machine as in claim 4 wherein said housing constitutes the major portion of the circumference of each mold throughout the mid portion thereof.

6. A machine as in claim 5 wherein heating means are associated with and positioned adjacent to each side of said rotary wheel.

ALEXANDER H. BURNETT.
JAMES J. PROHASKA.

References Cited in the file of this patent
UNITED STATES PATENTS

| Number | Name | Date |
|---|---|---|
| 100,590 | Bovey | Mar. 8, 1870 |
| 888,412 | Thomson | May 19, 1908 |
| 994,714 | Boyle | June 13, 1911 |
| 1,363,505 | Grabowski | Dec. 28, 1920 |
| 1,408,310 | Singh | Feb. 28, 1922 |
| 1,473,590 | Wallace | Nov. 6, 1923 |
| 1,642,353 | Arey | Sept. 13, 1927 |
| 2,181,737 | North | Nov. 28, 1939 |
| 2,199,144 | Tegarty | Apr. 30, 1940 |
| 2,366,379 | Bemis | Jan. 2, 1945 |